United States Patent [19]

Inazawa et al.

[11] Patent Number: 4,873,589
[45] Date of Patent: Oct. 10, 1989

[54] DATA RECORDER AND METHOD

[75] Inventors: Yoshizumi Inazawa; Masaki Yamada; Hiroshi Ishibashi; Shinya Ozaki, all of Kanagawa, Japan

[73] Assignee: Sony Corporation, Tokyo, Japan

[21] Appl. No.: 133,010

[22] Filed: Dec. 15, 1987

[30] Foreign Application Priority Data

| Dec. 19, 1986 | [JP] | Japan | 61-303080 |
| Dec. 22, 1986 | [JP] | Japan | 61-305881 |
| Dec. 24, 1986 | [JP] | Japan | 61-313856 |
| Dec. 24, 1986 | [JP] | Japan | 61-313857 |
| Dec. 25, 1986 | [JP] | Japan | 61-314922 |
| Jan. 8, 1987 | [JP] | Japan | 62-2084 |
| Jan. 12, 1987 | [JP] | Japan | 62-4434 |

[51] Int. Cl.$^4$ ............ G11B 5/09; G11B 5/00
[52] U.S. Cl. .................... 360/53; 360/32
[58] Field of Search .......... 360/27, 53, 49, 48, 360/32

[56] References Cited

U.S. PATENT DOCUMENTS

| 3,261,003 | 7/1966 | Cogar et al. | 360/53 |
| 4,403,263 | 9/1983 | Kageyama et al. | |
| 4,494,155 | 6/1985 | Veillard. | |
| 4,628,373 | 12/1986 | Takahashi et al. | |
| 4,670,976 | 6/1987 | Kobayashi et al. | |
| 4,688,116 | 8/1987 | Takahashi et al. | |

FOREIGN PATENT DOCUMENTS 0187029 12/1985 European Pat. Off.
0203797 5/1986 European Pat. Off.

Primary Examiner—Vincent P. Canney
Attorney, Agent, or Firm—Philip M. Shaw, Jr.

[57] ABSTRACT

A data streamer using a digital audio tape recorder (DAT) arranged such that even when the supply of incoming data to be recorded is interrupted, the data recorder is operated continuously and a data invalid signal is recorded on the tape in an area other than the data recording area, whereby the data recorder can record data at a high recording rate and in short time.

11 Claims, 11 Drawing Sheets

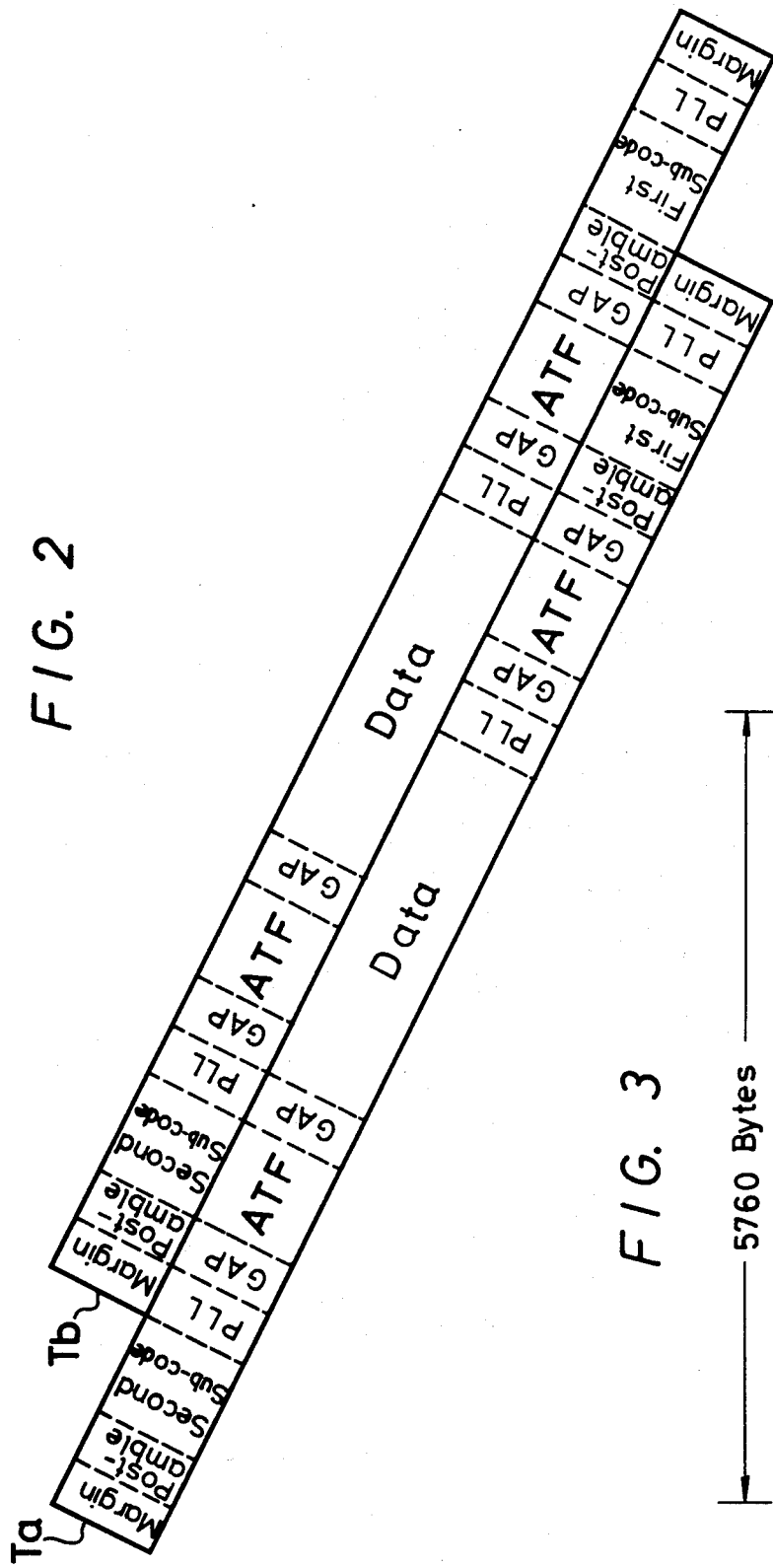

FIG. 4

| MSB | | | | | | | LSB |
|---|---|---|---|---|---|---|---|
| | ITEM | | | 0 | | SSNO | |
| | | | SSNO | | | | |
| | | | FNO | | | | |
| | TBD | | | | AFNO | | |
| | | | AFNO | | | | |
| | | | AFNO | | | | |
| | | | | | | | |
| | | | | | | | |

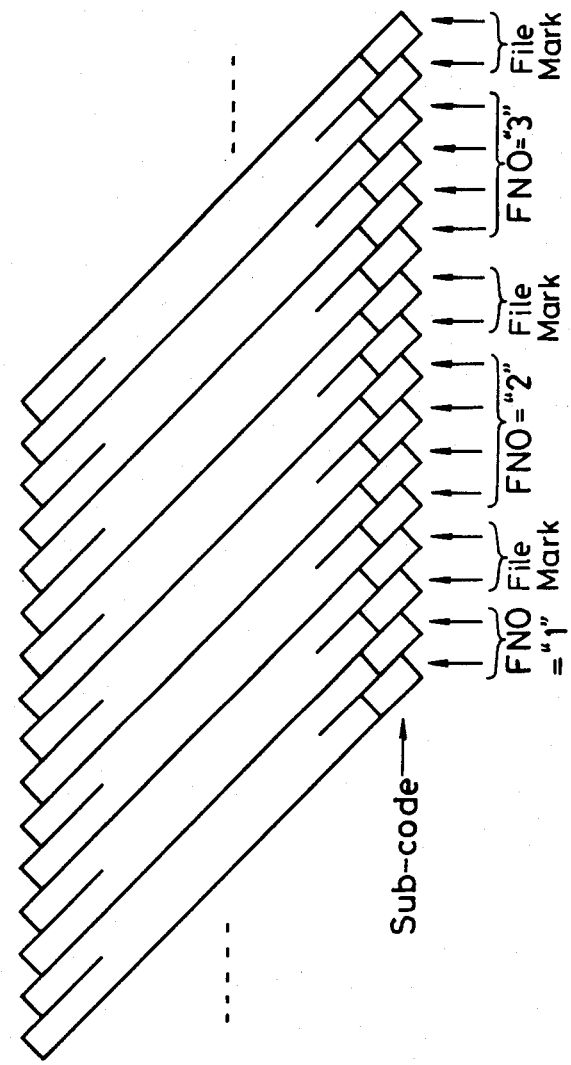
F I G. 5A
F I G. 5B
F I G. 5C

FIG. 7A
FIG. 7B
FIG. 7C

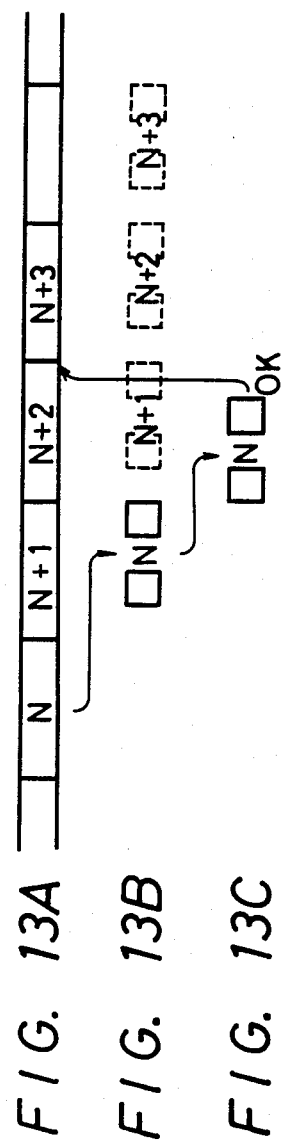
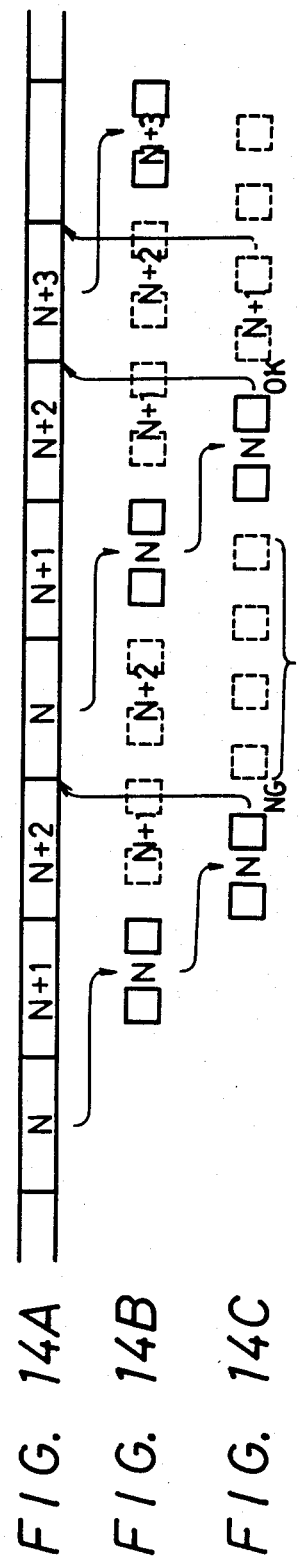
FIG. 13A
FIG. 13B
FIG. 13C
FIG. 14A
FIG. 14B
FIG. 14C

DATA RECORDER AND METHOD

BACKGROUND OF THE INVENTION

1. Field of the Invention

This invention relates generally to apparatus for recording and/or reproducing digital data. More particularly, the present invention relates to a rotary head type digital audio tape recorder (R-DAT) when used for recording data from a computer or the like.

2. Description of the Prior Art

In order to protect computer generated data written on a hard disc or the like, the data are sometimes transferred to a so-called data streamer (or data recorder) and are thereby recorded (or backed up) on other recording media once per day.

In most cases, a conventional data streamer is what might be called an analog audio tape recorder. Such an analog audio tape recorder, however, consumes a great quantity of the recording medium (i.e. tape). Also, such a conventional data streamer has a low data rate upon recording so that it takes a lot of time for transferring and recording the data. Further, it is not easy for the analog audio tape recorder to find out the starting point of the desired recorded data.

When data from, for example, the computer is recorded on a conventional audio tape recorder, an arbitrary file mark signal is supplied thereto from the computer. Upon reproduction, the location number of the file mark for the computer designated address is searched for. Since the conventional analog audio tape recorder is so arranged as to search for the location number of the file mark by counting the reproduced signal of the file mark in the normal reproduction operation, it takes a long time to search for the desired file mark. Thus, it is difficult to search for the location number of the file mark.

A DAT (digital audio tape recorder) has been developed, as described in "ES Review", pp. 11 to 14, published on December, 1985 by Sony Corporation, Shibaura Plant: ISSN 0389-7737. Since this DAT is designed so as to record and/or reproduce a digital signal that is a digitized audio signal, it is very suitable for recording the aforesaid data. The DAT, however, employs rotary heads so that it takes a lot of time to begin the recording or reproduction. As a result, if the supply of, for example, data to be recorded is interrupted and the recording is interrupted, there is then a risk that incoming data cannot be recorded smoothly because the conventional DAT cannot resume the recording quickly.

OBJECTS AND SUMMARY OF THE INVENTION

Accordingly, it is an object of this invention to provide an improved data recorder.

Another object of this invention is to provide a data recorder employing a digital audio tape recorder (DAT).

A further object of this invention is to provide a data recorder capable of high density recording and which requires less time for recording.

According to one aspect of the present invention, there is provided a digital data signal recorder of the type having a rotary head for forming a skewed track on a recording medium, means for transporting the recording medium past the rotary head, and signal control and processing circuitry for controlling the medium transporting means and supplying the digital signal to the rotary heads wherein the signal control and processing circuitry further comprises:

means for providing in a part of said skewed track formed by said rotary head, other than a part of the track on which the data signal is recorded, a signal area indicative that the digital data signal is invalid whereby when there is no data to be recorded, a signal indicating invalid data is recorded in said signal area.

These and other objects, features and advantages of the present invention will become apparent from the following detailed description of the preferred embodiments to be taken in conjunction with the accompanying drawings, throughout which like reference numerals identify like elements and parts.

BRIEF DESCRIPTION OF THE DRAWINGS

FIG. 2 is a diagram showing a tape format of the digital audio tape recorder (DAT);

FIG. 3 is a diagram showing a data format of the data recorder according to the first embodiment of the present invention;

FIG. 4 is a diagram used to explain sub data of the data recorder according to the first embodiment of the present invention;

FIGS. 5A to 5C are respectively diagrams used to explain the data recorder according to the first embodiment of the present invention;

FIGS. 7A to 7C are schematic representations used to explain the recording operation of the data recorder of the first embodiment of the present invention, respectively;

FIGS. 13A to 13C, FIGS. 14A to 14C and FIGS. 15A to 15C are respectively schematic representations illustrating the recording procedures of the data recorder of the second embodiment of the present invention.

DESCRIPTION OF THE PREFERRED EMBODIMENTS

Figure 1:
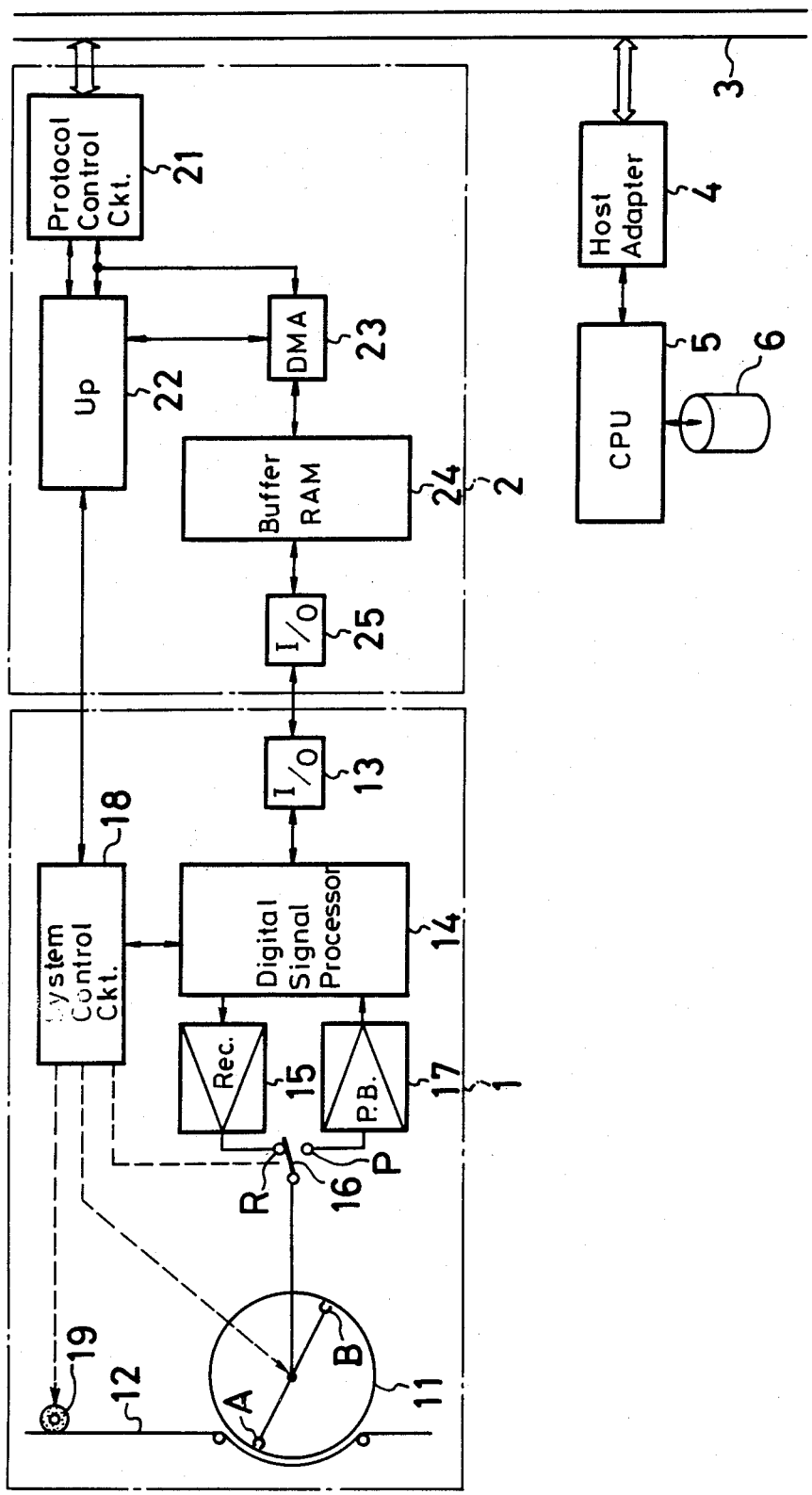
FIG. 1 a block diagram showing a first embodiment of a data recorder according to the present invention.

Referring initially to FIG. 1, the data recorder according to a first embodiment of the invention includes a digital audio tape recorder (DAT) 1. This digital audio tape recorder 1 is provided with a rotary head drum 11, and a magnetic tape 12 is wrapped around the peripheral surface of the rotary head drum 11, over an angular range of about 90. of head travel, and is transported past the head drum 11 by a tape transport mechanism 19. Two rotary heads A and B are mounted in the rotary head drum 11, and two skewed tracks are recorded and/or reproduced by the rotary heads A and B once per revolution of the rotary head drum 11 as shown more clearly in FIG. 2.

Incoming digital data is supplied to an I/O (input and output) circuit 13 of the DAT 1. The digital data from the I/O circuit 13 is supplied to a digital signal processor 14, in which it is converted into the DAT format. The digital signal converted in accordance with the DAT format is supplied through a recording amplifier 15 and a recording side contact R of a recording/reproducing change-over switch 16 to the rotary heads A and B, and is thereby recorded on the tape 12.

When the signal recorded on the tape 12 is reproduced by the rotary heads A and B, the reproduced signal is supplied though a reproducing side contact P of the recording/reproducing change-over switch 16 and a playback amplifier 17 &:o the digital signal processor 14, in which the reproduced signal is reconverted into the digital data and then delivered through I/O circuit 13 to the outside.

An incoming control signal is also supplied to a system control circuit 18 of the DAT 1. On the basis of the signal from the system control circuit 18, the rotary head drum 11 is controlled to rotate, tape transport mechanism 19 to run the tape 12 and the recording/reproducing change-over switch 16 to change in position. Also, upon recording, the signal from the system control circuit 18 is supplied to the digital signal processor 14 which then produces a sub-code signal or the like which will be described later. Upon reproduction, the signal extracted by the digital signal processor 14 is supplied to the system control circuit 18, whereby the tracking control operation is made and a part of this signal is fed to the outside.

In this digital audio tape recorder 1 by connecting a DA (digital-to-analog)/ AD (analog-to-digital) converting circuit to the output of the I/O circuit 13 and a predetermined control apparatus to the output of the system control circuit 18, it is possible to record and/or reproduce, for example, an analog audio signal.

In the present invention, however, an interface bus 3 is connected through a controller 2 as an external apparatus to the digital audio tape recorder 1. The interface bus 3 may be of the type which conforms, for example, to the SCSI small computer system interface) standard (see "NIKKEI ELECTRONICS", pp. 102 to 107, published by Nihon Keizai Shinbunsha on Oct. 6, 1986). A host computer 5 and a HDD (hard disc drive) 6 are connected to this interface bus 3 through a host adaptor 4.

In the above-mentioned controller 2, a protocol control circuit 21 is connected to the interface bus 3. Through the protocol control circuit 21, the data and the control signal are interchanged among a microcomputer 22 which controls the operation of the controller 2, a memory control or DMA (dynamic memory access) circuit 23 and the bus 3. The microcomputer 22 not only controls the operation of the controller 2 but also detects the address of the DMA circuit 23 and controls the operation of the DMA circuit 23. Also, data is interchanged between a buffer memory 24 and the interface bus 3 through the DMA circuit 23. Further, data is interchanged between the buffer memory 24 and the digital signal processor 14 provided in the DAT 1 via I/O circuits 25 and 13. In addition, the control signal is interchanged between the microcomputer 22 and the system control circuit 18.

Accordingly, in this apparatus, data written in the hard disc drive 6 is supplied through the interface bus 3 to the controller 2 in response to the transfer request from the controller 2 during recording and is then written in the buffer memory 24 through the DMA circuit 23. The data written in the buffer memory 24 is read out through the I/O circuit 25 and then fed to the digital audio tape recorder (DAT) 1. In the digital audio tape recorder 1, the data inputted to the I/O circuit 13 is regarded as being equivalent to that derived from the A/D converting circuit when the audio signal is recorded. Thus, this data is converted in accordance with a predetermined DAT format by the digital signal processor 14 and is thereby recorded on the tape 12 by the rotary heads A and B.

Upon reproduction, the signal reproduced from the tape 12 by the heads A and B is reconverted by the digital signal processor 14 and thereby data corresponding to the audio signal is produced. This data is supplied through the I/O circuit 13 to the controller 2. In the controller 2, the data written in the buffer memory 24 through the I/O circuit 25 is read out through the DMA circuit 23 and then written in the hard disc drive 6 through the interface bus 3.

The DAT format for the signal to be recorded on the tape 12 will now be described. As shown in FIG. 2, two tracks Ta and Tb respectively recorded by the rotary heads A and B constitute one frame, and each of these tracks Ta and Tb is formed as though coming from the underside of the sheet of the drawing. In this embodiment, the signal is recorded on each of the tracks Ta, Tb over an angular range of 90°. Each of the tracks Ta, Tb is formed (viewed from right to left in FIG. 2) of a predetermined margin area of 5.051°, a PLL (phase locked loop) pre-amble sub-code area of 0.918°, a first sub-code area of 3.673°, a post-amble area of 0.459°, an interblock gap area of 1.378°, a tracking (ATF (auto tracking finding)) signal area of 2.296°, an interblock gap area of 1.378°, a PLL pre-amble sub-code area of 0.918°, a data area of 58.776°, an interblock gap area of 1.378°, an ATF signal area of 2.296°, an interblock gap area of 1,378°, a PLL pre-amble sub-code area of 0.918° a second sub-code area of 3.673°, a post-amble area of 0.459° and a margin area of 5.051° in this sequential order, though the scale of FIG. 2 is not accurate for simplicity. Further, in the apparatus of the present invention, the data inputted from the I/O circuit 13 is supplied to the digital signal processor 14, in which it is added to the error-detection and error-correction codes and others in accordance with the predetermined DAT format, interleaved in a predetermined relationship, distributed and then inserted into the respective data areas of the tracks Ta, Tb.

In this case, 5760 bytes of original data can be recorded in the two data areas which constitute the above-mentioned single frame. When this apparatus is used as the above-mentioned data streamer, however, incoming data is processed in units of $2^n$, for example, 512 bytes. Since the recording capacity of 5760 bytes forming one frame is not an integral multiple of the above-mentioned units, it is not possible to establish matching between the DAT 1 and the external apparatus.

For this reason, when the data written in the buffer memory 24 through the interface bus 3 is read out to the DAT 1, 11 blocks of 512 bytes each are successively read as, for example, shown in FIG. 3. Also, there is provided an area in which 128 bytes of filler data, that is data other than the digital data signal from the computer 5, is recorded, thus making it possible to establish matching between the DAT 1 and the external apparatus. The reading operation as mentioned above can be controlled by controlling the DMA circuit 23 in response to the control signal from the microcomputer 22. Upon reproduction, the 128-bytes of data succeeding, for example, the 11 blocks of 512-bytes of data can be simply ignored.

According to the aforesaid apparatus, the DAT 1 can be utilized as a data streamer in this way. With the above-mentioned circuit arrangement, since the rotary head drum 11 is rotated at for example, 2000 r.p.m., data can be recorded at extremely high speed, e.g., 192,000 bytes per second. Also, the amount of the recording medium which is consumed during recording can be very much reduced. Further, according to the above-mentioned arrangement, since matching between the DAT 1 and the external apparatus is established, it is possible to record and/or reproduce data satisfactorily.

An error-correction code for the data to be recorded or the like may be recorded in the remaining 128 bytes instead of recording filler data. If the error-correction code shares much of the remaining 128 bytes, the number of blocks of data to be recorded in one frame may be decreased and the code area or the like may be increased.

Furthermore, in the aforesaid apparatus, 2048 bits of data can be recorded in the first and second sub-code areas shown in FIG. 2, respectively. In accordance with the format in which a digital audio signal is recorded in the data area, the 2048 bits of data in the sub-code area are divided into pack data, each pack data being formed of 64 bits and a time code for the recorded signal and information such as a calendar (recording date) or the like can be recorded for every pack.

Therefore, by assigning data for the data recorder into this pack, it is possible to carry out various control operations by using this pack.

FIG. 4 schematically illustrates the pack format therefor. Referring to FIG. 4, 64 bits are each divided into 8 words and each word is formed of 8 bits. Four bits in the MSB (most significant bit) side of the starting (the first) word in this pack format are assigned to an ITEM area and this ITEM area is made common to the recording format of the audio signal. The contents of this pack format are expressed by a 4 bit binary code. Of the 16 binary codes expressed by the 4 bits, 9 binary codes are already defined so as to record the audio signal and the arbitrary binary codes in the remaining 7 binary codes are defined for the data recorder.

Three bits in the LSB (least significant bit) side of the first word and 8 bits of the second word are assigned to a save set number (SSNO) area which indicates the number of the save set. In total, 11 bits constitute the binary data which indicates the number in which data is backed up from, for example, the top of the tape 12.

Eight bits of the third word are assigned to a file number (FNO) area. In this FNO area, there is provided the binary data which indicates the serial number of the file within the data backed up (save-set) for one time.

Four bits in the LSB side of the fourth word and both of the 8 bits of the fifth and sixth words are assigned to an absolute frame number (AFNO) area. In total, 20 bits constitute the binary data which indicates the serial number of the effective frames from the top of the tape 12.

Eight bits of the seventh word are assigned to a situation area in which data indicating the situation of the frame are provided. That is, in the 8 bits of the seventh word, the starting it in the MSB side is assigned to a lead out. flag area indicating that the frame is the final position of the back-up data (lead out); the second bit thereof is assigned to a data invalid flag area indicating that the data of the frame is invalid; the third bit is assigned to an amble flag area indicating the amble frame of the starting or ending point of the recorded data; and the fourth bit thereof is assigned to a file mark flag area indicating the file mark frame. Four bits in the LSB side of the seventh word express in binary code the number of blocks recorded per frame where one block represents the amount of data recorded per frame, for example, the unit amount of incoming and outgoing data of the external apparatus. The fifth bit from the MSB side of the first word is made "0", and 4 bits in the MSB side of the fourth word are assigned to extension bits (TBD) and are all made "0" for the time being. Also, 8 bits of the eighth word are assigned to parity data for the first to seventh words.

When the data from, for example, the hard disc drive 6 is backed up in the aforesaid apparatus, the write address and the read address of the DMA circuit 23 are compared with each other. When the buffer memory 24 has no data because of an interruption in the supply of data and the write address and the read address of the DMA circuit 23 become coincident with each other, a signal indicative of that state is supplied to the microcomputer 22. The signal from the microcomputer 22 is supplied through the system control circuit 18 to the digital signal processor 14, whereby the data invalid flag is set to "1" in the second bit of the seventh word in the sub-code portion of the pack format of the data recorder. Also, arbitrary, invalid data is recorded in the data area.

According to this apparatus, since the recording is continuously made even when the supply of data is interrupted, it is possible to avoid the problem that the recording is stopped and then resumed with a delay of time caused by the interruption of the recording. Thus, the recording can always be carried out smoothly.

According to the apparatus of the invention as described above, the DAT 1 can be used as a data streamer. In this case, since the rotary head drum 11 rotates at, for example, 2000 r.p.m., the data can be recorded at very high speed, e.g., 192,000 bytes per second and the amount of the recording medium that the apparatus consumes in the recording mode is reduced considerably.

Further, since the incoming data can be recorded smoothly even when the supply of data is interrupted, it is possible to record and/or reproduce the data satisfactorily.

According to the above-mentioned arrangement, since the recording density is made very high, invalid data can be recorded without trouble. If the period of invalid data continues for more than one second, however, the operation of the DAT may be stopped.

During the period of invalid data, the absolute frame number (AFNO) provided in the fourth to sixth words within the above-mentioned pack format is not increased so that the operation for searching the data by using the absolute frame number is accurately carried out.

When the data from, for example, the hard disc drive 6 is backed up by the above-mentioned apparatus, the apparatus starts recording the data under the condition that the file number (FNO) provided in the third word of the sub-code area of the pack format for the data recorder is first selected to be "0". Also, if under this condition a file mark signal is supplied from the host computer 5, the corresponding write address from the DMA circuit 23 is written in the microcomputer 22. Then, if the read address of the DMA circuit 23 is detected and this read address coincides with the thus written address, then predetermined invalid data is read out from the buffer memory 24 and the invalid data is inserted into the remainder of the data portion of one frame in accordance with the recording format of the DAT 1. Further, invalid data is read out during the succeeding frame period and the above file number (FNO) of the pack format for the data recorder is incremented by "1". Also, the file mark flag is set to "1" in the fourth bit of the seventh word. Then, the next data is recorded from the frame next to the succeeding frame and the file number (FNO) at that time is made the same as that of the immediately-preceding file mark.

To be specific, if data (reference letters a, b and c respectively designate the above-mentioned blocks of data) shown in FIG. 5A are supplied and the file mark signal is supplied as shown in FIG. 5B, data are recorded in data areas of the respective frames as shown in FIG. 5C. Also, if the file mark signal is supplied, the file mark is recorded in the next frame (file mark frame). According to the file mark to be recorded at that time, flag data of "1," indicative of the file mark, is set in the fourth bit of the seventh word of the sub-code area in the pack format for the data recorder and at that time, the file number (FNO) is incremented by "1".

If the amount of data (the number of blocks) supplied thereto until the arrival of the file mark is beyond the amount of data in one frame, the data are recorded over a plurality of frames. In this case, the file number (FNO) is selected to be the same value.

The file mark signal is recorded in this way. When it is requested that the thus recorded signal is to be searched for by utilizing the file mark, the file number (FNO) of the frame reproduced at the time when the search is requested is detected and then added to the number (±) of the file marks that should be searched for. Then, the added value and the above-mentioned detected value are compared with each other. If the added value is larger than the detected value, the search is started at high speed in the forward direction, while if it is smaller, the search is started also at high speed, but in the reverse direction. Further, during the high speed search the file number (FNO) detected and the aforesaid added value are compared with each other. If the relationship between the added value and the detected value is changed, the search direction for the recorded signal is reversed and the search speed is reduced by half, thus making it possible to search for a desired file mark.

In that case, the bit number of the file number must be secured so as to prevent the same file number (FNO) from becoming continuous in the frames detected during the highest speed search mode.

According to this apparatus, since the file number (FNO) which increments in response to the file mark signal is recorded, it is possible to search with ease for the recorded signal at high speed by using this file number.

In the above-mentioned apparatus, predetermined amble signals are located at the starting and ending portions of the recorded data. Also, there is provided a lead out signal having a duration sufficient so that it can be read in the high speed search mode at the end of the recording.

Figure 6:
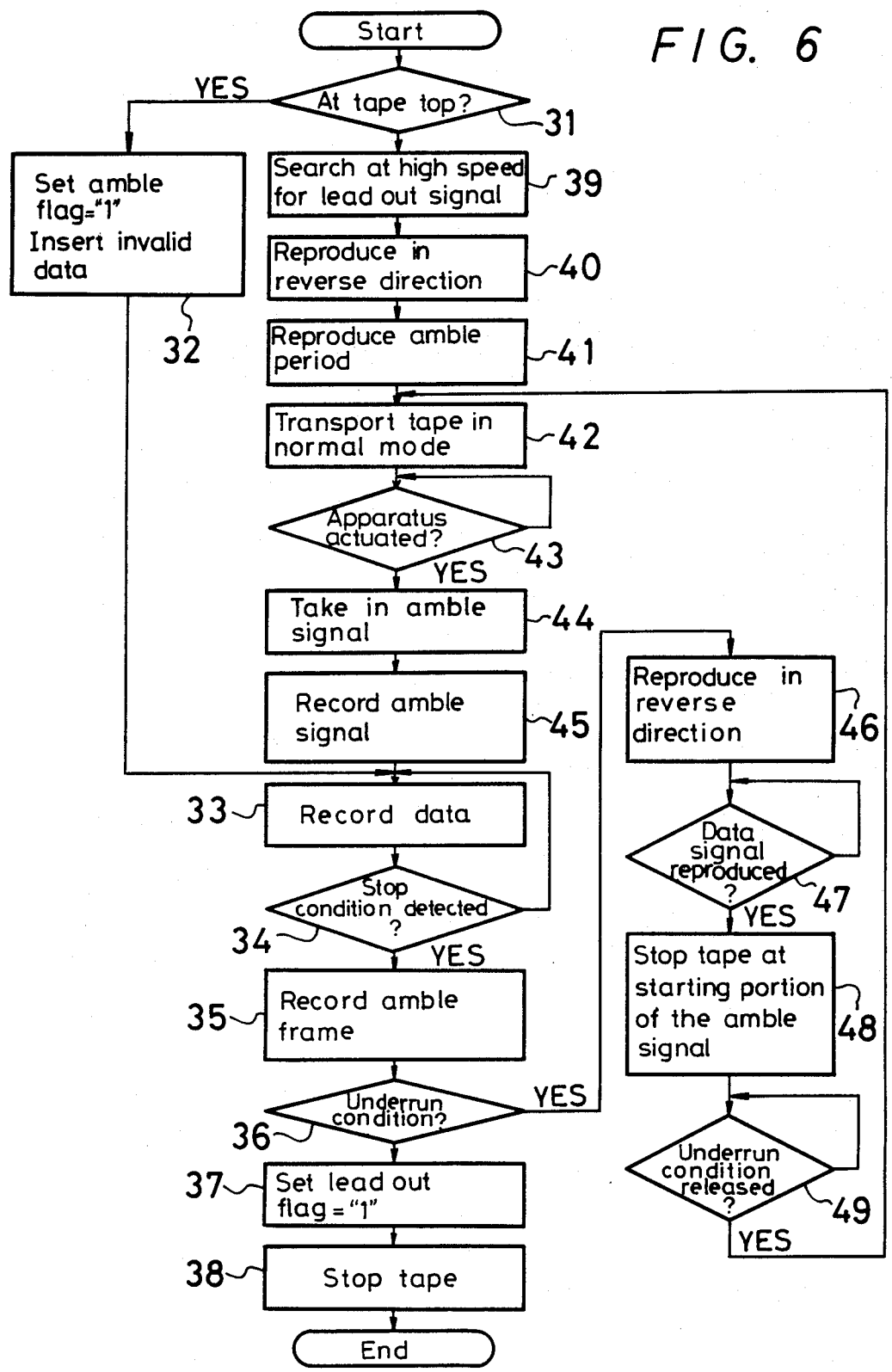
FIGS. 6, 8 and 9 are respectively flow charts to which reference will be made in explaining the operation of the data recorder of the present invention.

FIG. 6 illustrates a flow chart to which references will be made in explaining the aforesaid operation. When the recording is started, it is determined at a first step 31 whether the recording is started from the beginning of the tape or not. If it is determined that the recording is started from the top of the tape 12 as represented by YES, the program goes to step 32 in which the amble flag is set to "1" at the third bit of the seventh word of the sub-code area of the pack format for the data recorder and a frame in which arbitrary, invalid data is inserted into the data portion is recorded for a predetermined period. At that time, the respective values provided in the first to sixth words of the pack format for the same data recorder are reset to the initial values or particular values. Particularly, the absolute frame number (AFNO) does not increment from "0" but repeats the same value.

If the recording of the amble signal is ended, the data is recorded at step 33 and this recording is continued until it is decided at the next decisional step 34 that the recording is ended or that the apparatus is disabled for recording (placed in the underrun condition) because the buffer memory 24 does not have sufficient data. If the aforesaid stop condition is detected as represented by YES at step 34, a similar amble frame is recorded during a predetermined period at step 35. Then, it is determined at the next decisional step 36 whether the stop condition is the underrun condition or not. If it is not the underrun condition, the program goes to step 37 in which the lead out flag is set to "1" in the first bit of the seventh word and the frame in which the invalid data is inserted into the data portion is recorded for a time period of sufficient duration so that it can be detected in the high speed search mode, for example, for more than 300 frames if the high speed search operation is carried out at a speed 300 times as high as the recording speed. In this case, in the amble frame and the lead out frame in steps 35 and 37, the values of the first to sixth words are selected to be equal to those in the period of the preceding data signal. Thereafter, the tape 12 is stopped at the next step 38 and the recording is ended.

Thus, the amble frame is provided at the starting and ending portions of the recorded data and the lead out frame of predetermined time duration is recorded next to the last amble frame.

Now, let it be considered that the recording is started from some intermediate point on the tape 12. It is determined at decisional step 31 whether or not the recording is started from an intermediate point on the tape 12. If so, the processing goes to step 39 in which the aforesaid lead out signal is searched for at high speed. If the frame in which the lead out flag is set as mentioned above is recorded continuously for more than 300 frames and is reproduced at a tape speed 300 times as high as that of the recording mode, the rotary heads A and B reproduce the sub-code areas of the corresponding tracks more than one time, whereby the lead out signal can be searched for by detecting the above-mentioned lead out flag.

When the search operation for the lead out signal is ended, the program goes to the next step 40. At step 40, reproduction in the reverse direction is carried out toward the preceding amble signal and the amble period is reproduced, for example, for about 1 to 2 seconds at step 41. At the next step 42 the tape 12 is transported in the normal mode. Then, it is determined at decisional step 43 whether the apparatus is actuated or not. If the apparatus is actuated as represented by YES at step 43, the amble signal is taken in at step 44. Then, the amble signal is recorded for several frames at step 45. The amble signal to be recorded herein is as follows: "1" is set for the amble flag at the third bit of the seventh word of the aforesaid pack format for the data recorder; arbitrary, invalid data is inserted into the data portion; the value of the preceding amble signal detected when the save-set numbers (SSNO) of the first and second words of the pack format for the data recorder are reproduced in the reverse direction is incremented by "1"; the file number (FNO) of the third word is changed to "0"; and the absolute frame numbers of the fourth to sixth words repeat the same preceding values.

If the recording of the amble signal is ended, the program goes to step 33, and an ending routine similar to that described above (from steps 33 to 38) is executed and the routine is ended.

Further, if it is decided at decisional step 36 that the stop condition is the underrun condition, the program goes to step 46. At step 46, reverse reproduction is carried out. This reverse reproduction is continued until the reproduced signal is changed from the amble signal to the data signal at the next decisional step 47. If the reproduced signal is changed to the data signal at step 47, the tape 12 is stopped at the starting portion of the amble signal at step 48. Then, it is determined at the next decisional step 48 whether the underrun condition is released or not. If the underrun condition is released, the program goes to step 42. Thereafter, a similar routine for recording the signal at the starting portion (from steps 42 to 45 and step 33) is executed.

According to the apparatus as mentioned above, since the amble signal is recorded at the starting and ending portions of the recorded signal, it is possible to actuate the rotary heads or the like during this period. Thus, the starting portion of the data can be prevented from being cut off. Also, since the previously-recorded signal can be erased by the overwrite, there is then no risk that misoperation will be caused by the remaining signal portions that are not fully erased. Therefore, the recording can be made satisfactorily by using the append command.

In other words, when the DAT tape travels as shown in FIG. 7A, each back-up recording is carried out as shown in FIG. 7B. Thus, the data are recorded as shown in FIG. 7C. In this case, since the amble signal A is recorded at the start and end portions of the recorded data the signal is overwritten from the amble signal A, thus making it possible to always carry out the recording satisfactorily even in case of the underrun and append modes.

Therefore, according to the aforesaid apparatus, the DAT 1 can be utilized as a data streamer. In this case, since the rotary head drum 11 rotates at, for example, 2000 r.p.m., the data can be recorded at very high speed, e.g., 192,000 bytes per second. Also, the amount of recording medium, i.e. tape 12, consumed for the recording can be decreased considerably. Further, according to the above-mentioned arrangement, by recording the amble signal in the start portion and the end portion of the recorded data, it is possible to satisfactorily record and/or reproduce the digital data.

In accordance with the aforesaid arrangement, since a digital signal of high frequency is recorded, it is possible to erase the previously-recorded signal by the overwrite recording. Thus, a previously-recorded lead out signal or the like can be erased without any special erase head.

During the period of invalid data, the absolute frame number (AFNO) provided in the fourth to sixth words within the above-mentioned pack format is not increased so that the operation for searching the data by using the absolute frame number is accurately carried out.

Figure 8:
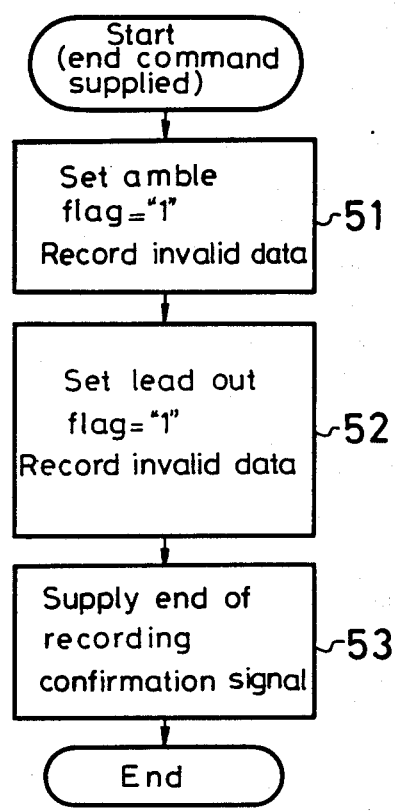

FIG. 8 is a flow chart to which references will be made in explaining how to record the lead out signal When the end command from the host computer 5 is supplied, this routine is started. At the first step 51, an amble flag is set to "1" in the third bit of the seventh word of the sub-code area of the pack format for the data recorder. Also, the frame in which arbitrary, invalid data is inserted into the data portion thereof is recorded for a period of about 2 to 3 seconds. At that time, the respective values provided in the first to sixth words of the same pack format for the data recorder are made the same as those of the period of the preceding data signal. Particularly, the absolute frame number (AFNO) is prevented from being incremented from the previous value but repeats the same value.

Then, at the next step 52, the lead out flag is set to "1" in the first bit of the seventh word similarly and the frame in which invalid data is inserted into the data portion thereof is recorded for a period which can be detected by the high speed search operation, for example more than 300 frames can be recorded if the high speed search is carried out at a speed 200 times as high as the normal speed. Also in this case, the values of the first to sixth words are made the same as those described hereinbefore. At the next step 53, a confirmation signal indicative of the end of the recording is supplied to the host computer 5 and this routine is ended.

Thus, when the end command is supplied from the host computer 5 at the end of, for example, the back-up, a lead out signal of a predetermined duration is recorded in that portion.

Figure 9:
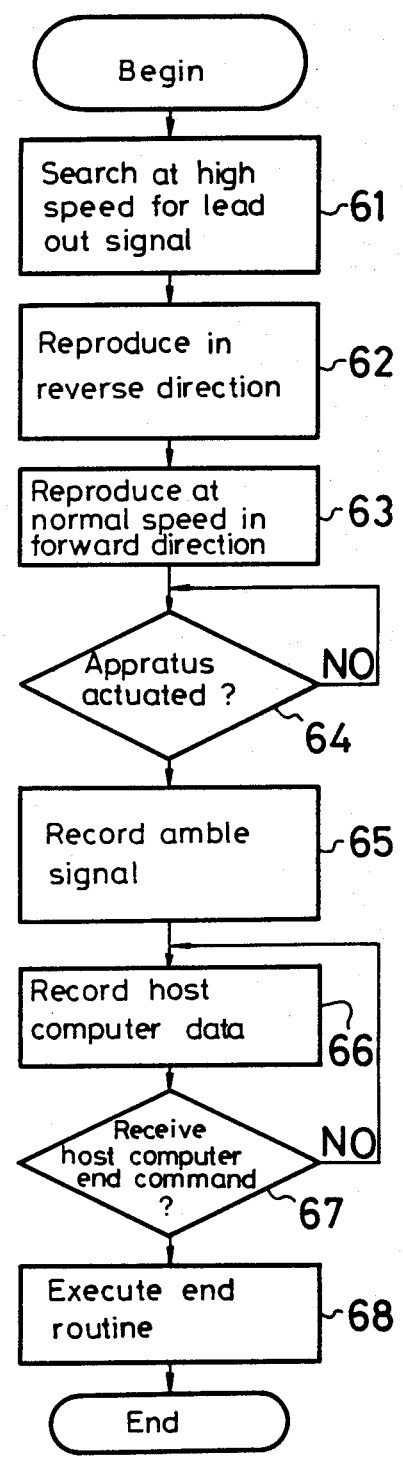

A description will now be given for the case where an append recording is made. The routine shown in the flow chart forming FIG. 9 is executed for the append command issued from the host computer 5. Referring to this flow chart, this routine begins with step 61. At step 61, the above-mentioned lead out signal is searched for at high speed. When more than 300 frames in which the lead out flags are set as set forth above are continuously recorded, even if they are reproduced at a speed 200 times as high as the speed of the recording mode, the rotary heads A and B reproduce the sub-code areas of the corresponding tracks more than one time during this time period. Thus, the lead out signal can be searched for by detecting the aforesaid lead out flag.

If the search operation for the lead out signal is ended at step 61, the program goes to the next step 62, in which reverse reproduction is carried out towards the preceding amble signal and the amble signal is reproduce during the amble period of about 1 to 2 seconds. At the next step 63, the tape 12 is transported in the normal or forward direction. Then, it is determined at the next decisional step 64 whether the apparatus is actuated or not. If the apparatus is actuated, the program goes to step 65 in which the amble signal is recorded for a period of several frames. The amble signal thus recorded is such that "1" is set in the amble flag at the third bit of the seventh word of the pack format for the data recorder. Arbitrary, invalid data is inserted into the data portion; the save set number (SSNO) of the first and second words in the pack format for the data recorder is such that "1" is added to the previous amble signal detected by the reverse reproduction; the file number (FNO) of the third word is made "0" and the absolute frame number (AFNO) of the fourth to sixth words repeat the same value as those before.

After the recording of the amble signal is ended, the program goes to the next step 66, in which data from the host-computer 5 is recorded. This recording is continued until the end command from the host computer 5 is supplied at step 67. When the end command is supplied, an end routine 68 similar to that shown in FIG. 8 is executed and then, the routine is ended.

According to this apparatus, as described above, since during append recording mode the lead out signal is searched for and the recording is started from a portion preceding the amble signal, it is possible to erase the preceding lead out signal by overwrite recording. Thus, by always searching for the initial lead out signal from the tape top, it is possible to satisfactorily carry out the append recording mode.

In other words, when the DAT tape travels as shown in FIG. 7A, each back-up recording is carried out as shown in FIG. 7B. Thus, the data are recorded as shown in FIG. 7C. In this case, since the lead out signal L remains only in the end portion of the recorded data, it is possible to always carry out the recording satisfactorily by searching for the lead out signal L.

Figure 10:
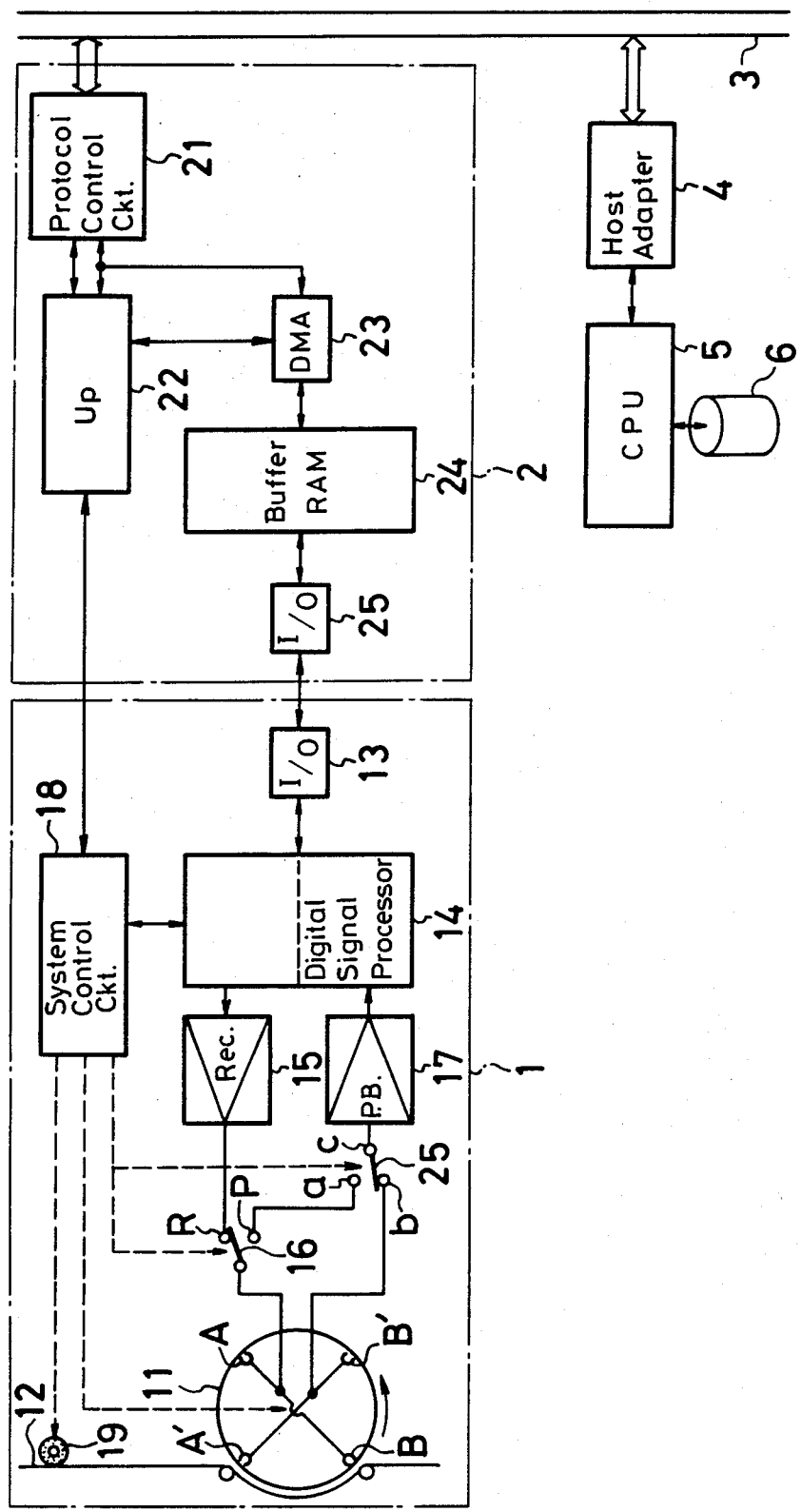
FIG. 10 is a block diagram showing a second embodiment of the data recorder according to the present invention.

FIG. 10 illustrates another embodiment of the data streamer DAT according to the present invention. In FIG. 10, like parts corresponding to those of FIG. 1 are marked with the same references and therefore need not be described in detail for simplicity.

Referring to FIG. 10, two recording and/or reproducing rotary heads A and B are mounted to the rotary head drum 11 with an angular spacing of 180° therebetween. Two skewed tracks are recorded and/or reproduced per one revolution of the rotary head drum 11.

Incoming digital data is supplied to the I/O circuit 13. The signal from the I/O circuit 13 is supplied to the digital signal processor 14, in which it is converted into a signal in accordance with the above-mentioned DAT format. The DAT format converted signal is supplied through the recording amplifier 15 and the recording side contact R of the recording/reproducing change-over switch 16 to the rotary heads A and B and is thereby recorded on the tape 12. When the signal recorded on the tape 12 is reproduced by the rotary heads A and B, the reproduced signal is supplied through the reproducing side contact P of the recording/reproducing change-over switch 16 to one fixed contact a of a change over switch 25.

Figure 11:
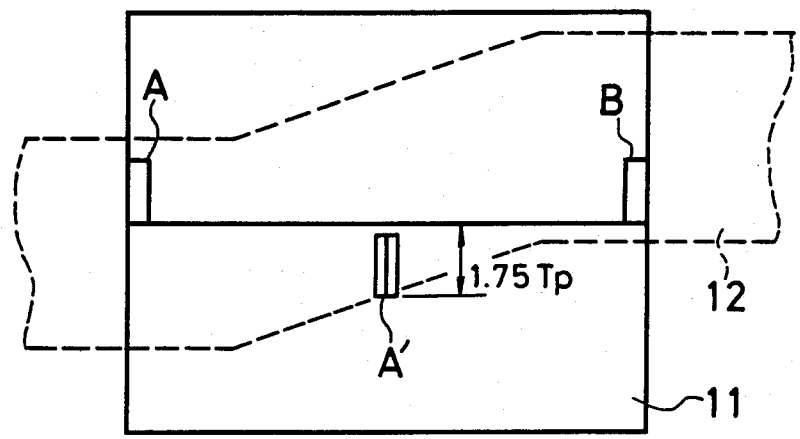
FIG. 11 is a schematic representation of a rotary head used in the data recorder of the second embodiment of the present invention.

To the above-mentioned rotary head drum 11, there are also mounted detecting and reproducing rotary heads A' and B' at positions delayed from the recording and reproducing rotary heads A and B by 270° each relative to the direction in which the rotary head drum 11 is rotated as shown by an arrow. Also, the rotary heads A' and B' are mounted on the rotary head drum 11 so as to have a difference in level of, for example, 1.75 track pitches (Tp) as illustrated in FIG. 11.

Figure 12:
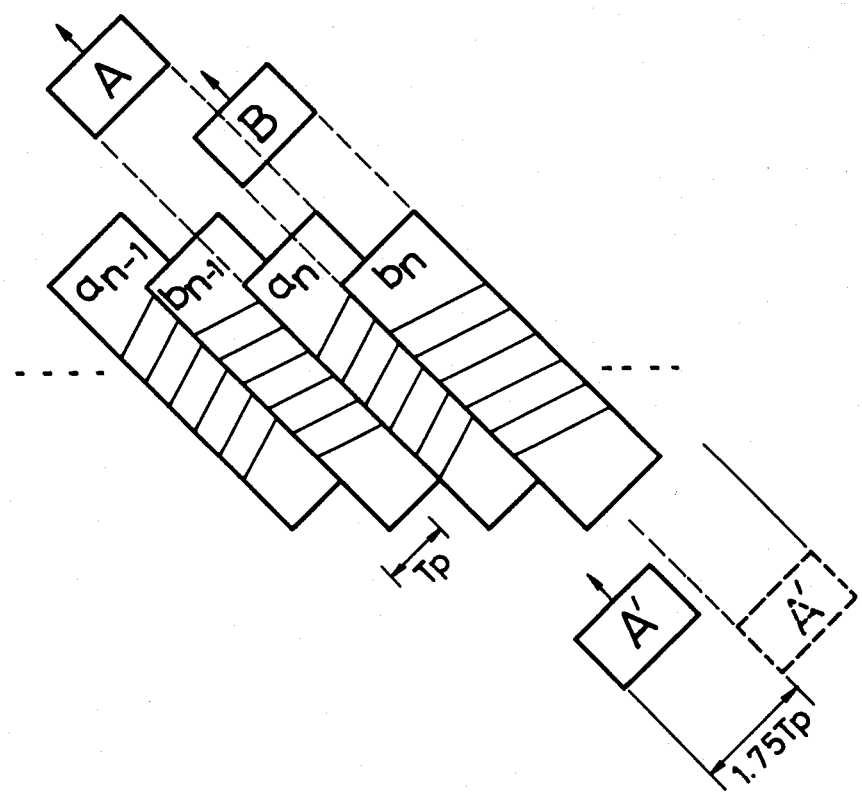
FIG. 12 is a schematic representation of a track pattern formed by the rotary head of the data recorder of the second embodiment of the present invention.

To be more concrete, let it be assumed that the recording and reproducing heads A and B each have a width 1.5 times as wide as the track pitch Tp as shown in FIG. 12. Then, an amount equal to 0.5 track pitch of the track recorded by, for example, the head A can be erased by recording the next track by the head B having no difference in level and disposed at a position delayed from the former head by 180°, thus a guardbandless recording can be carried out. In this case, if the head A' is mounted without a difference in level, the relative position of the head A' is as shown by a broken line in FIG. 12. But, since the head A' is disposed with difference in level of 1.75 track pitches, the head A' is located at a track position where the portion recorded by the head A passes through the position of the head B. If the heads A and B have different head gap azimuth angles, the azimuth angles of the heads A, A' and those of the heads B, B' are made equal to each other.

In the aforesaid apparatus, the reproduced signal from the heads A', B' is supplied to the other fixed contact b of the change-over switch 25, and the signal produced at the movable contact c of this change-over switch 25 is supplied through the playback amplifier 17 to the digital signal processor 14, in which it is reconverted into digital data. The digital data from the digital signal processor 14 is supplied to the outside through the I/O circuit 13.

Though not shown, the digital signal processor 14 includes a circuit for generating error-detecting and error-correcting codes and an error-detecting circuit and an error-correcting circuit using the above-mentioned codes. A common computing circuit is employed for generating the error-correcting code and for correcting an error by using the error-correcting code. Accordingly, upon recording, the error-correcting circuit is disabled at the same time when the error-detecting code and the error-correcting code generating circuit is operated. The error-detecting circuit can be used independently.

In consequence, upon recording, the signal reproduced by the heads A', B' is supplied through the switch 25 and the playback amplifier 17 to the digital signal processor 14, for the detection of errors, as described above. In this case, if a detected error cannot be fully corrected by the error correcting circuit upon reproduction, the error-detected signal is supplied to the system control circuit 18. Under the control of the system control circuit 18, the same data is re-recorded.

To be specific, when data N, N+1, N+2, . . . each corresponding to one frame, as shown in FIG. 13A are supplied from the controller 2 to the DAT 1, these data are converted in accordance with the DAT format as shown in FIG. 13B, and then recorded on the tape 12 by the rotary heads A and B. The recorded signals are reproduced by the rotary heads A', B' and then detected for error as shown in FIG. 13C. Therefore, according to the aforesaid apparatus, any error in the recorded data is detected after 3 frames.

Accordingly, when the error is detected in the above digital signal processor 14, the signal from the system control circuit 18 is supplied to the microcomputer 22. Then, the DMA circuit 23 is controlled to allow the buffer memory 24 to read out again the immediately preceding 3-frames of data. Thus, when an error is detected in the data N as shown in FIG. 14, data N is read again after data N+1, N+2 have already been read out, data N in which the error was detected is recorded again, and then data N+1, N+2, . . . are recorded. In this case, since the data N+1 and N+2 are also repetitively recorded, it is not necessary to again detect for errors in the rerecorded data N+1 and N+2.

When the DAT 1 of the present invention is used as a data streamer for a computer, it is necessary to record the file mark and the end signal indicative of the section of data derived from the computer. In that case, in order for the file mark to be searched with ease, it has been proposed that the end signal and the file mark be recorded for one frame. However, in such a case, if data FM forming, for example, the file mark frame is directly recorded just after the last data X which forms the above-mentioned frame, when an error is detected from the data X or previous data, the data FM of file mark frame is repeatedly recorded.

Figure 15A:
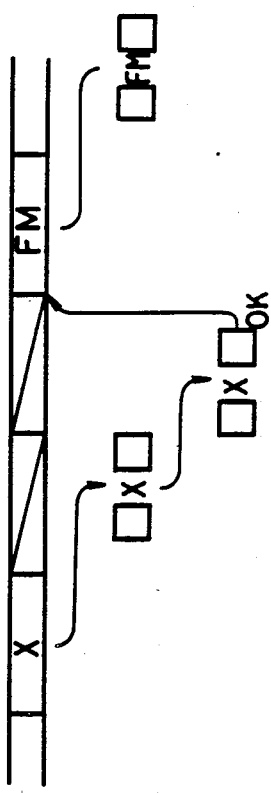

Therefore, an arbitrary signal period of 2 frames is provided between the last data X and the file mark frame data FM as shown in FIG. 15A. This arbitrary signal period may be formed by repeatedly recording the invalid data or the last data X under the control of the microcomputer 22 in the controller 2.

Figure 15B:
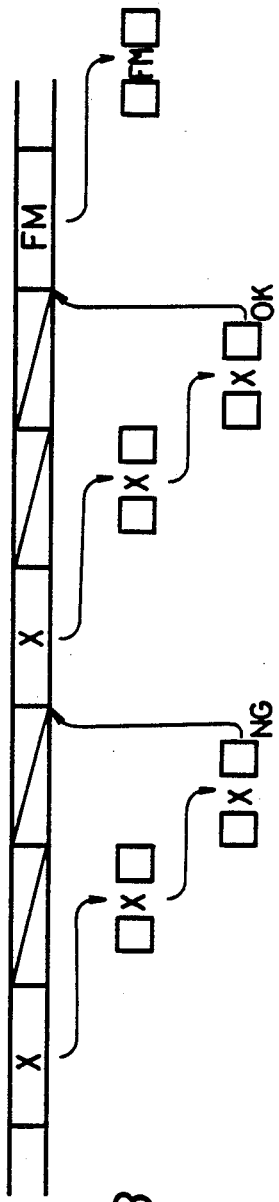
Figure 15C:
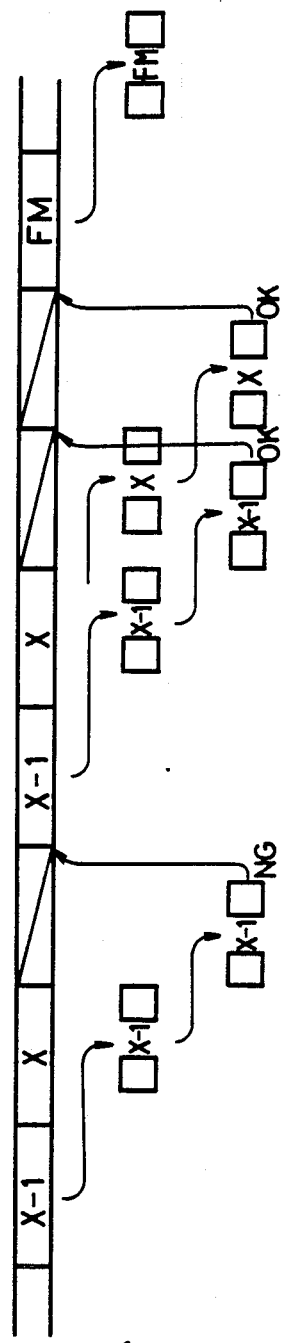

Thus, even if an error is detected in the data X or X-1, the data FM of file mark frame can be prevented from being recorded repeatedly, as shown in FIGS. 15B and 15C.

Upon reproduction, the signal reproduced from the tape 12 by the heads A, B is supplied to the digital signal processor 14, in which it is reconverted into data corresponding to an audio signal. If an error is detected from he reproduced data, the tape 12 is not immediately rewound and reproduced again because there is a possibility that the same data is recorded repeatedly as described above. However, if data N+3 is reproduced before correct data is reproduced as data N or data such as the file mark or the like is reproduced before correct data is reproduced as data X and X-1, the tape 12 is immediately rewound and reproduced again. In this case, there remains a possibility that correct data can be obtained from the frame in which data with a detected error is recorded.

Further, this data is supplied through the I/O circuit 13 to the controller 2. In the controller 2, data written in the buffer memory 24 through the I/O circuit 25 is read through the DMA circuit 23 and then written in the hard disc drive 6 via the bus 3.

According to the apparatus of this embodiment, since the original recorded signal is reproduced by the head A' from the track recorded by, for example, the head A and one portion of which is erased by the recording by the head B and then checked, the recorded signal can always be checked accurately without being affected by the disturbed movement of the tape 12. Thus, by re-recording using the thus detected signal, it is possible to record data with high reliability.

The reproducing and detecting heads A', B' are not necessarily formed of parts which require high accuracy. On the contrary, even if the accuracy of their parts is made low, it is still possible to check the data under more strict conditions. Further, the difference in level between the heads A', B' is not limited to the example of the above-mentioned value (1.75 Tp) but may be changed freely in order to afford more strict conditions. Furthermore, the difference in level between the heads A', B' may be changed with the angular distance between the heads A, A' and B, B'.

According to the apparatus of the present invention, as set forth above, the DAT 1 can be employed as a data streamer. According to the aforesaid arrangement, since the rotary head drum 11 is rotated at, for example, 2000 r.p.m., data can be recorded at very high speed, e.g., 192,000 bytes per second. Also, it is possible to considerably reduce the amount of recording medium which is consumed during recording.

Furthermore, according to the aforesaid arrangement, the recorded signal can be checked with high accuracy and, also re-recording can be carried out smoothly when an error is detected. Thus, the data can be recorded satisfactorily.

The above description is given for the preferred embodiments of the invention but it will be apparent that many modifications and variations could be effected by one skilled in the art without departing from the spirit or scope of the novel concepts of the invention so that the scope of the invention should be determined by the appended claims only.

We claim as our invention:

1. A digital data signal recorder comprising a rotary head means for recording the digital data signal on a part of a skewed track on a recording medium, means for transporting the recording medium past the rotary head means, means for detecting invalid data in the digital data signal, means controlled by the detecting means for recording in another part of said skewed track signal indicating that the data is invalid, and wherein the medium transporting means is controllable to have a normal recording speed mode and a high speed mode at which the recording medium is transported past the rotary head means at a rate much faster than the normal recording speed and further comprising means for recording on the recording medium, when a recording is ended, a predetermined end signal for a period having a duration which can be detected during the high speed mode, means for detecting a start position of said end signal at the next recording operation, and means for carrying out overwrite recording on the recording medium at said detected start position.

2. A data recorder according to claim 1, further comprising means for recording on the recording medium, just before the end signal, an amble signal indicative of the end of the recording.

3. A data recorder according to claim 1, wherein the data recorder is a digital audio tape recorder of the type including a pair of rotary recording heads, a recording amplifier and a playback amplifier, each of which has a separate input and an output, switching means for selectively connecting the rotary head means either to the input of the playback amplifier or the output of the recording amplifier, digital signal processor means for receiving input data, converting it into a predetermined digital audio tape recorder (DAT) format, outputting the DAT formatted data to the input of the recording amplifier, and for receiving DAT formatted data from the output of the playback amplifier, converting it from the DAT format to digital data and outputting the digital data, and a system control circuit connected to the rotary head means, the tape transport means, the switching means and the digital signal processor means for controlling the operations thereof.

4. A data recorder according to claim 3, further comprising a microcomputer, protocol control means for interchanging data and control signals between an external computer and the microcomputer, direct memory access means connected to the protocol control means and further connected to and controlled by the microcomputer, buffer memory means connected to the direct memory access means, and input/output means connected between the buffer memory and the digital signal processor and wherein the system control means and the microcomputer are interconnected to exchange control signals.

5. A digital data signal recorder comprising a rotary head means for recording the digital data signal on a part of a skewed track on a recording medium, wherein said rotary head means comprises at least a pair of recording heads and a pair of reproducing heads having characteristics corresponding to said recording heads and located at positions at which a portion recorded on the recording medium by one of said pair of recording heads arrives after passing by one of said pair of recording heads, means for transporting the recording medium past the rotary head means, means for detecting invalid data in the digital data signal, means controlled by the detecting means for recording in another part of said skewed track a signal indicating that the data is invalid, detecting means, supplied with the outputs of said reproducing heads, for detecting an error in the recorded signal, and control means responsive to said detecting means for re-recording on the recording medium a signal whose content is the same as that of the original signal prior to the recording in which the error was detected.

6. A method of recording a digital data signal on a part of a skewed track on a recording medium, comprising the steps of transporting the recording medium relative to a rotary recording head, detecting invalid data in the digital data signal, recording in another part of said skewed track a signal indicating that the data is invalid, recording on the recording medium, when a recording is ended, a predetermined end signal for a period having a duration which can be detected when the recording medium is transported past the rotary head at a high speed, much faster than the normal recording speed, detecting a start position of said end signal at the next recording step, and overwrite recording on the recording medium at the detected start position.

7. A method of recording a digital data signal according to claim 6, further comprising the step of recording on the recording medium, just before the end signal, an amble signal indicative of the end of the recording.

8. A method of recording a digital data signal according to claim 6, wherein said recording step comprises using at least a pair of recording heads and a pair of reproducing heads having characteristics corresponding to said recording heads and located at positions at which a portion recorded on the recording medium by one of said pair of recording heads arrives after passing by one of said pair of recording heads, and further comprising the step of detecting in the outputs of said reproducing heads, an error in the recorded signal, and re-recording on the recording medium a signal whose content is the same as that of the original signal prior to the recording in which the error was detected.

9. A digital data signal recorder comprising a rotary head means for recording the digital data signal on a part of a skewed track on a recording medium, means for transporting the recording medium past the rotary head means, wherein the medium transporting means is controllable to have a normal recording speed mode and a high speed mode at which the recording medium is transported past the rotary head means at a rate much faster than the normal recording speed, and means for recording on the recording medium, when a recording is ended, a predetermined end signal for a period having a duration which can be detected during the high speed mode, means for detecting a start position of said end signal at the next recording operation, and means controlled by the end signal detecting means for carrying out overwrite recording on the recording medium at said detected start position.

10. A digital signal recorder comprising a rotary head means for recording the digital data signal on a part of a skewed track on a recording medium, means for transporting the recording medium past the rotary head means, wherein said rotary head means comprises at least a pair of recording heads and a pair of reproducing heads having characteristics corresponding to said recording heads and located at positions at which a portion recorded on the recording medium by one of said pair of recording heads arrives after passing by one of said pair of recording heads, and detecting means, supplied with the outputs of said reproducing heads, for detecting an error in the recorded signal, and control means responsive to said detecting means for re-recording on the recording medium a signal whose content is the same as that of the original signal prior to the recording in which the error was detected.

11. A data recorder comprising a rotary head means for recording digital data signal on a part of a skewed track on a recording medium and for reproducing said digital data;

means for transporting the recording medium past the rotary head means;

digital signal processor means for receiving input data, converting it into a predetermined digital audio tape recorder (DAT) format, outputting the DAT formatted data to the rotary head means for recording on the medium, receiving reproduced DAT formatted data from the rotary head means, converting it from the DAT format to digital data and outputting the digital data;

a system control means connected to the rotary head means, the tape transport means, and digital signal processor means for controlling the operations thereof; and a controller means connected between an external computer and the digital signal processor means for exchanging data between them, said controller means including a buffer memory means for momentarily storing the digital data from the digital signal processor means and data from the computer and for outputting the stored digital data to the computer and the stored data to the digital signal processor.

* * * * *